(12) United States Patent
Atik et al.

(10) Patent No.: US 12,525,144 B2
(45) Date of Patent: Jan. 13, 2026

(54) TRAUMA TEST UNIT

(71) Applicant: MANISA CELAL BAYAR UNIVERSITESI STRATEJI GELISTIRME DAIRE BASKANLIGI, Manisa (TR)

(72) Inventors: Enver Atik, Manisa (TR); Gokhan Eyici, Manisa (TR); Cuneyt Temiz, Manisa (TR)

(73) Assignee: MANISA CELAL BAYAR UNIVERSITESI STRATEJI GELISTIRME DAIRE BASKANLIGI, Manisa (TR)

( * ) Notice: Subject to any disclaimer, the term of this patent is extended or adjusted under 35 U.S.C. 154(b) by 405 days.

(21) Appl. No.: 18/266,825

(22) PCT Filed: Nov. 25, 2021

(86) PCT No.: PCT/TR2021/051297
§ 371 (c)(1),
(2) Date: Jun. 13, 2023

(87) PCT Pub. No.: WO2022/132089
PCT Pub. Date: Jun. 23, 2022

(65) Prior Publication Data
US 2024/0054915 A1    Feb. 15, 2024

(30) Foreign Application Priority Data
Dec. 14, 2020   (TR) .................. 2020/20449

(51) Int. Cl.
*G09B 23/28*    (2006.01)

(52) U.S. Cl.
CPC .................... *G09B 23/28* (2013.01)

(58) Field of Classification Search
CPC .............. G09B 9/00; G09B 3/28; G09B 3/30
See application file for complete search history.

(56) References Cited

U.S. PATENT DOCUMENTS 11,781,967 B1 * 10/2023 McDonnell ............ G01N 3/066
                                                      114/342
2009/0011394 A1    1/2009 Meglan et al.
(Continued)

FOREIGN PATENT DOCUMENTS

SU          1439659 A1    11/1988

*Primary Examiner* — Timothy A Musselman
(74) *Attorney, Agent, or Firm* — Bayramoglu Law Offices LLC

(57) ABSTRACT

A trauma test unit to simulate all parameters of an impact which creates trauma effect is provided. The trauma test unit includes a plate whereon the samples whereon impact shall be applied are placed, at least one body connected to said plate, and at least one movement arm for providing exertion of pressure onto the sample and connected to said body by means of at least one guiding element from one side thereof. The improvement is that at least one drive element is provided which is associated for enabling actuation of said movement arm, the movement arm comprises at least one load cell connected for enabling measurement of the trauma impact, said drive element comprises at least one control unit where the physical control of the trauma impact is provided and connected for enabling controlling of the trauma impact by means of said load cell.

5 Claims, 2 Drawing Sheets

(56) References Cited

U.S. PATENT DOCUMENTS

| | | |
|---|---|---|
| 2016/0076967 A1 | 3/2016 | O'Shaughnessy et al. |
| 2020/0025660 A1* | 1/2020 | Fischer .................. F16D 65/18 |
| 2020/0056968 A1* | 2/2020 | Egboiyi ................... G01N 3/08 |

\* cited by examiner

TRAUMA TEST UNIT

CROSS REFERENCE TO THE RELATED APPLICATIONS

This application is the national phase entry of International Application No. PCT/TR2021/051297, filed on Nov. 25, 2021, which is based upon and claims priority to Turkish Patent Application No. 2020/20449, filed on Dec. 14, 2020, the entire contents of which are incorporated herein by reference.

TECHNICAL FIELD

The present invention relates to a trauma test unit in order to simulate all parameters of an impact which creates trauma effect in medicine field and having a plate whereon the samples whereon impact shall be applied are placed, at least one body connected to said plate, and at least one movement arm for providing exertion of pressure onto the sample and connected to said body by means of at least one guiding element from one side thereof.

BACKGROUND

Trauma, which is a frequently seen or experienced problem, is a medical field which is becoming frequent every passing day and where persons most need treatment. Trauma is defined as local wound formation which occurs as a result of a mechanical, thermal, electrical and chemical effect which leads to tissue or organ damage or loss and effective in a manner deteriorating body and spirit integrity on the living being, and as injuries dependent on these.

As a result of trauma, the damage in neural tissues like brain or spinal cord and the resulting tissue damage unfortunately affect an increasing number of persons. Such traumas have serious results like death, paralysis and becoming bedridden. The basic reasons of these injuries are high energy traumas like traffic accidents and falling from a high place. During trauma, the basic factor that determines the degree of the damage in the tissue is the amplitude of the force exerted on neural tissue. On the other hand, the direction of the force, the duration of the force and the anatomic localization of the deformation formed in the tissue and the surface width are important factors which determine the level of tissue damage degree.

Creation of the damage, formed in the spinal cord and brain as a result of trauma, in experimental medium leads to important researches and developments related to diagnosis and treatment. However, it is not very easy to imitate such traumas in experimental mediums. For this reason, not only trauma force has to be known but also the duration, angle, surface of the trauma and the exact numerical value of the force which reaches the tissue in reality have to be known. However, the methods and tools, used in modeling experimental neural tissue injuries today, are not dominant on all of these parameters.

The basic methods for creation of experimental nerve tissue damage can be summarized as "Falling of weight from a high place", "mechanical compression" and "forming damage in the tissue by means of ischemic or chemical methods". Among these methods, "clips compression model of Tator", "simple pneumatic systems not having pressure feedback" can be mentioned. While these methods and tools simply lead to damage in the tissue, since the above mentioned parameters of the trauma impact are not dominated, the degree of the damage which occurs in the tissue as a result cannot be exactly determined. Therefore, the natural trauma process is not completely simulated and the force transferred to the tissue cannot be exactly determined. As a result, standardization of the experiment stays in a doubtful form.

All parameters of the trauma impact which occurs in formation of tissue damage cannot be regenerated. The formed damage cannot be determined as the force transferred to the tissue during natural trauma process, the impact speed, the impact duration, the shape of the impact end, the impact repetition number, etc.

As a result, because of the abovementioned problems, an improvement is required in the related technical field.

SUMMARY

The present invention relates to a trauma test unit, for eliminating the abovementioned disadvantages and for bringing new advantages to the related technical field.

An object of the present invention is to provide a trauma test unit where different impact forces can be examined.

In order to realize the abovementioned objects and the objects which are to be deducted from the detailed description below, the present invention is a trauma test unit in order to simulate all parameters of an impact which creates trauma effect in medicine field and having a plate whereon the samples whereon impact shall be applied are placed, at least one body connected to said plate, and at least one movement arm for providing exertion of pressure onto the sample and connected to said body by means of at least one guiding element from one side thereof. Accordingly, the improvement is that at least one drive element is provided which is associated for enabling actuation of said movement arm,
- the movement arm comprises at least one load cell connected for enabling measurement of the trauma impact,
- said drive element comprises at least one control unit where the physical control of the trauma impact is provided and connected for enabling controlling of the trauma impact by means of said load cell. Thus, in the trauma test unit, parameters like force amplitude, effective duration of the force, impact end, impact number can be controlled.

In a possible embodiment of the present invention, the drive element is associated with at least one screwed shaft for providing vertical movement capability to the movement arm. Thus, the movement arm can be actuated in the vertical axis.

In another possible embodiment of the present invention, at least one sensor is provided for enabling controlling of the distance between the load cell and the plate provided in the vicinity of the load cell. Thus, the distance between the load cell and the plate can be processed in the control unit.

In another possible embodiment of the present invention, said control unit is associated with at least one trauma impact end provided on the plate. Thus, different impact forces can be observed in a single step.

In another possible embodiment of the present invention, the control unit provides data tracking by including at least one user interface. Thus, the user can share the effect of the impacts and the input of the impact forces which are to be applied.

DETAILED DESCRIPTION OF THE EMBODIMENTS

In this detailed description, the subject matter trauma test unit (10) is explained with references to examples without forming any restrictive effect only in order to make the subject more understandable.

Figure 1:
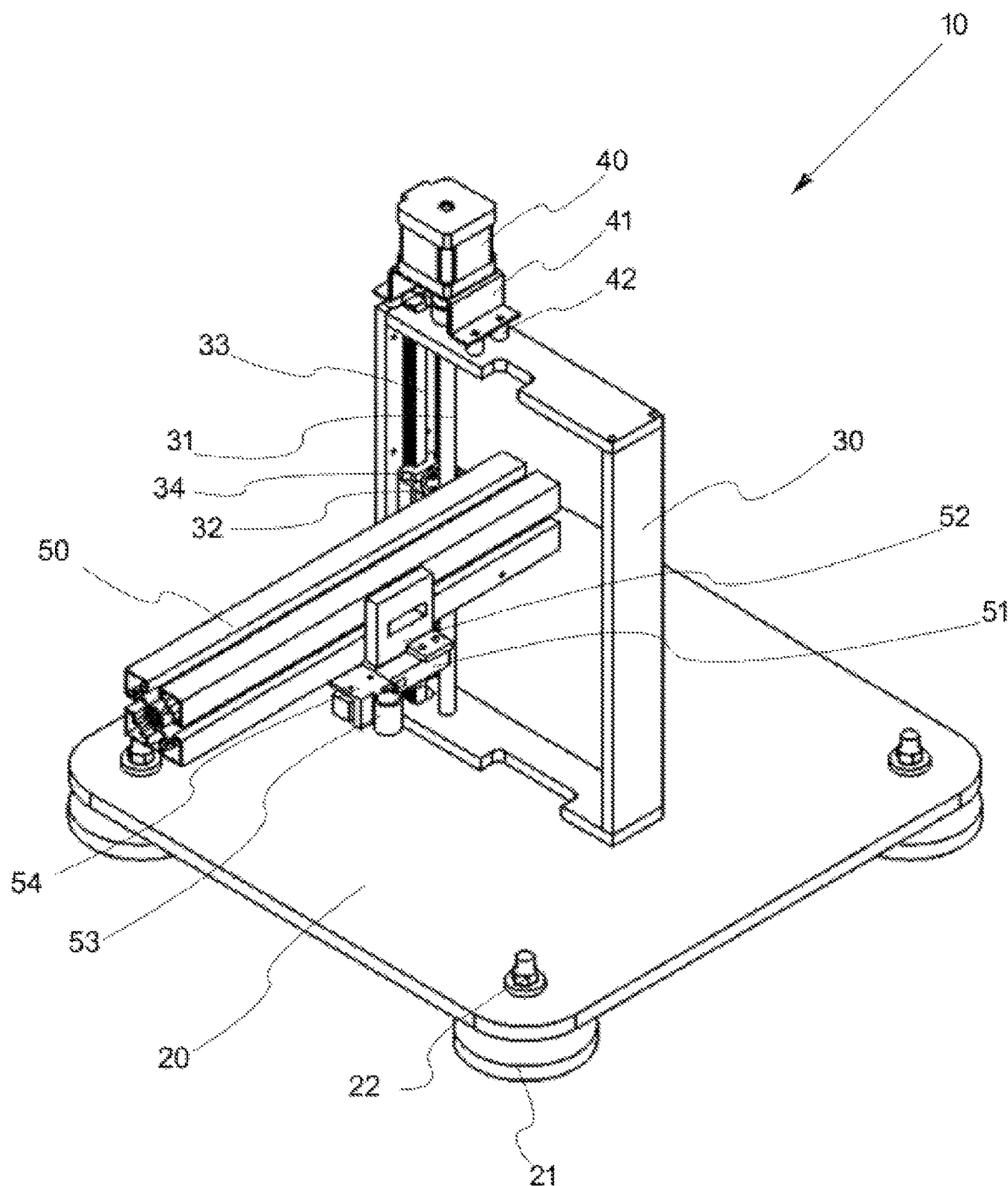
In FIG. 1, a representative perspective view of the subject matter trauma test unit is given.

In FIG. 1, a representative perspective view of the subject matter trauma test unit (10) is given. Accordingly, said trauma test unit (10) enables realization of scientific studies and development of treatment methods by realizing experiments related to impacts which lead to trauma in medicine field, particularly in brain and nerve surgery. The trauma test unit (10) comprises at least one plate (20). Said plate (20) is essentially a substrate where the intensity which forms the trauma shall be applied. In a possible embodiment of the present invention, the plate (20) has a structure made of compact laminated material. The plate (20) is associated to the floor plane by means of at least one positioning element (21). Said positioning element (21) is provided at the four corners of the plate (20) such that the height thereof can be adjusted. Said positioning element (21) is essentially an articulated foot. The positioning element (21) provides the trauma test unit (10) to be positioned in a balanced manner on the floor. The positioning element (21) is connected to the lower plate (20) in a removable manner by means of at least one first connection element (22). Said first connection element (22) is essentially a nut.

The trauma test unit (10) comprises at least one body (30). Said body (30) is a holder connected vertically on the lower plate (20). The body (30) is essentially a frame structure made of aluminum sigma profile material. The body (30) comprises at least one guiding element (33) connected at a vertical edge. Said guiding element (33) is essentially a linear guide. The guiding element (33) is a guide rail and a system which moves on said guide rail for providing movement in the linear plane in devices and machines. The body (30) comprises at least one movement arm (50) associated with the guiding element (33). Said movement arm (50) is essentially a transfer embodiment which enables horizontal movement. The movement arm (50) provides bearing to application of the force, which leads to trauma, at different positions. The movement arm (50) is connected to at least one screwed shaft (31) provided in a manner co-operating with the guiding element (33). Said screwed shaft (31) is connected to at least one drive element (40) from one side. The screwed shaft (31) comprises at least one second connection element (32). Said second connection element is essentially a nut. The screwed shaft (31) connected to the second connection element (32) is a shaft which transforms the rotational movement, taken from the drive element (40), into linear movement. The guiding element (33) is connected to at least one carrier element (34). Said carrier element (34) is essentially a linear vehicle. The carrier element (34) enables direct carrying on the guiding element (33). The carrier element (34) provided on the guiding element (33) is connected to the second connection element (32) provided on the screwed shaft (31). The second connection element (32) provides connection of the movement arm (50) to the screwed shaft (31).

Said drive element (40) is essentially a step motor and provides movement in the vertical axis. The drive element (40) is connected to the body (30) by means of at least one first connection bracket (41). Said first connection bracket (41) is essentially a housing-like structure. The first connection bracket (41) is connected to at least one support shoe (42). Said support shoe (42) provides integrity for the connection of the body (30) and the first connection bracket (41).

The trauma test unit (10) comprises at least one load cell (51) connected at the movement arm (50). Said load cell (51) is a component which enables sensing for essentially transforming the force value into electrical signal for enabling measurement of the trauma impact. The load cell (51) is connected to the movement arm (50) by means of at least one second connection bracket (52). Said second connection bracket (52) is essentially housing and can displace on the movement arm (50). The trauma test unit (10) essentially comprises at least one sensor (53) which is associated with the movement arm (50). Said sensor (53) is essentially a distance sensor. The sensor (53) provides tracking of the distance between the plate (20) and the load cell (51).

Figure 2:
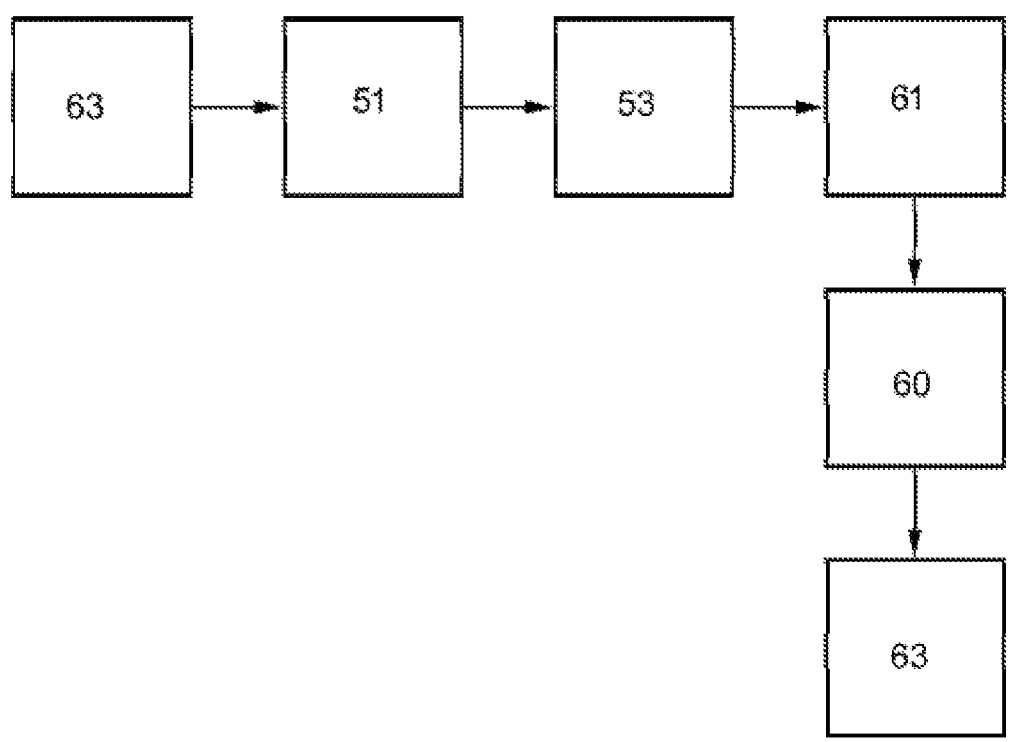
In FIG. 2, a representative schematic view of the control unit in the subject matter trauma test unit is given.

In FIG. 2, a representative schematic view of the control unit (60) in the subject matter trauma test unit (10) is given. Accordingly, in the trauma test unit (10), said control unit (60) comprises at least one trauma impact end (63). Said trauma impact end (63) essentially enables observing of different trauma formations depending on the impacts exerted thereon. In a possible embodiment of the present invention, the trauma impact end (63) which has different heights is provided four in numbers in a manner made of aluminum material. The trauma impact end (63) is connected to load cell (51). The control unit (60) comprises at least one processor unit (61). Said processor unit (61) is software where the information coming from the sensor (53) is processed. The processor unit (61) enables controlling of the drive element (40) by means of the control unit (60). The control unit (60) comprises at least one user interface (62). Said user interface (62) is essentially a display device which enables presentation of the impacts, which form the trauma, to the user.

Together with all these embodiments, different impact measurements are made by means of the trauma test unit (10). In order to simulate neural tissue damage like brain or spinal cord as a result of trauma, the parameters like the amplitude of the force, the effective duration of the force, the impact end and the impact number can be controlled. In the trauma test unit (10), by using four different trauma impact end (63), one and more than one impact damage measurements can be made up to 1000 grams of force.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

10 Trauma test unit
20 Plate
21 Positioning element
22 First connection element
30 Body
31 Screwed shaft
32 Second connection element
33 Guiding element
34 Carrier element
40 Drive element
41 First connection bracket 42 Support shoe
50 Movement arm
51 Load cell
52 Second connection bracket
53 Sensor
54 Third connection bracket
60 Control unit
61 Processor unit
62 User interface
63 Trauma impact end

The invention claimed is:

1. A trauma test unit to simulate parameters of an impact creating an trauma effect, comprising:
   a plate, wherein a sample configured to be applied with the impact is placed on the plate,
   at least one body connected to the plate, and
   at least one movement arm for providing an exertion of a pressure onto the sample and connected to the at least one body by at least one guiding element from one side of the at least one body,
   wherein
   at least one drive element is provided and associated for enabling an actuation of the at least one movement arm, the at least one movement arm comprises at least one load cell connected for enabling a measurement of the impact,
   the at least one drive element comprises at least one control for providing a physical control of the impact and connected for enabling controlling of the impact by the at least one load cell.

2. The trauma test unit according to claim 1, wherein the at least one drive element is associated with at least one screwed shaft for providing a vertical movement capability to the at least one movement arm.

3. The trauma test unit according to claim 1, wherein at least one sensor is provided for enabling controlling of a distance between the at least one load cell and the plate provided in a vicinity of the at least one load cell.

4. The trauma test unit according to claim 1, wherein the at least one control unit is associated with at least one trauma impact end provided on the plate.

5. The trauma test unit according to claim 1, wherein the at least one control unit is configured to provide a data tracking by comprising at least one user interface.

* * * * *